Oct. 26, 1926.
E. P. KINNE
1,604,356
TRANSITIONAL CAR COUPLING
Filed July 21, 1924    3 Sheets-Sheet 2
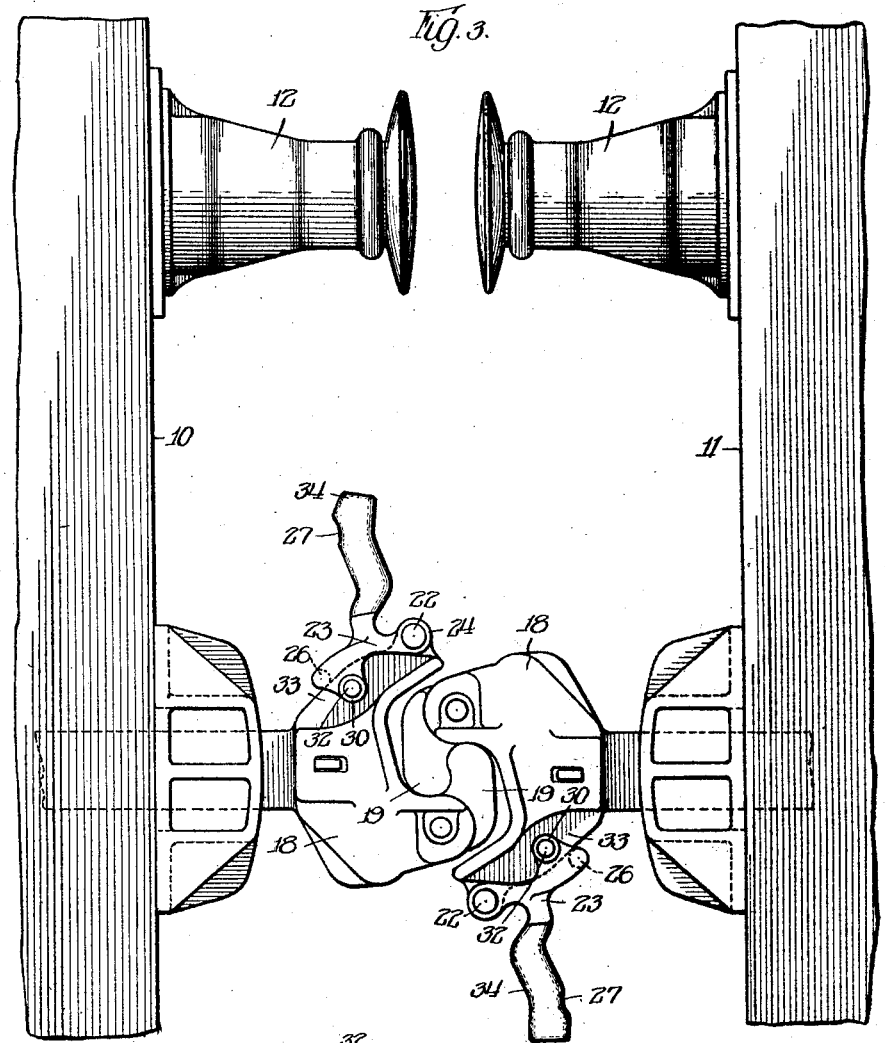
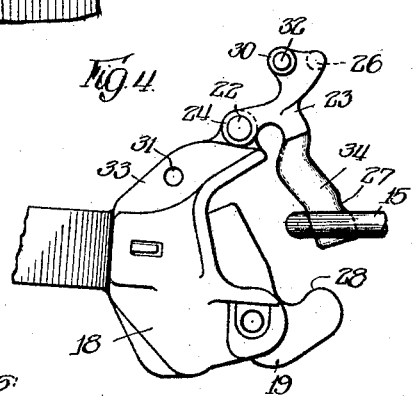
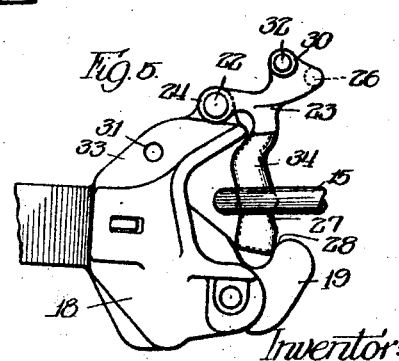

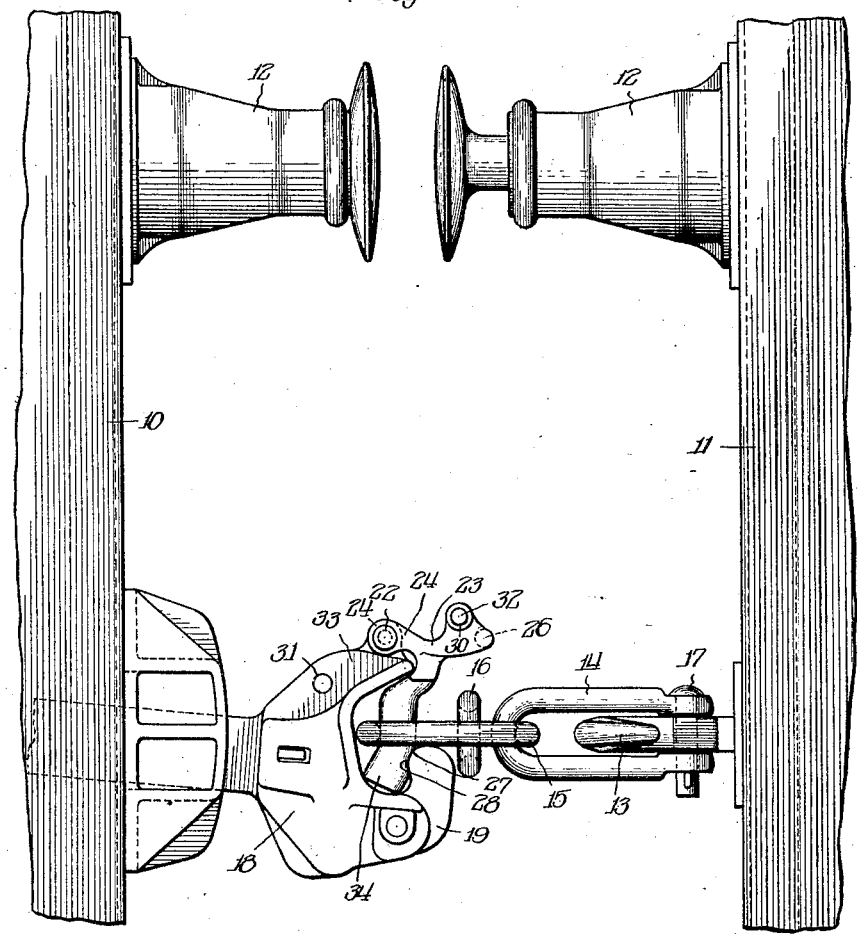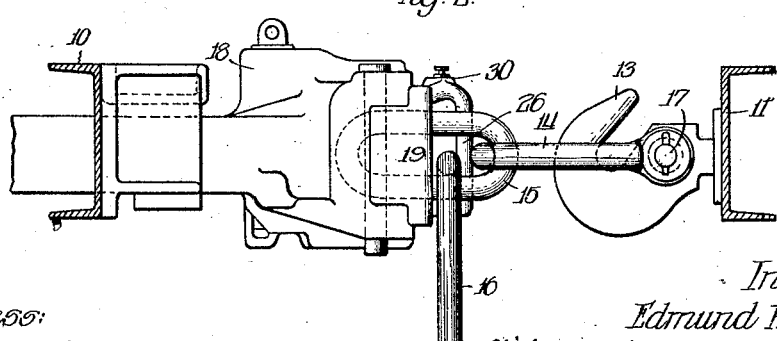

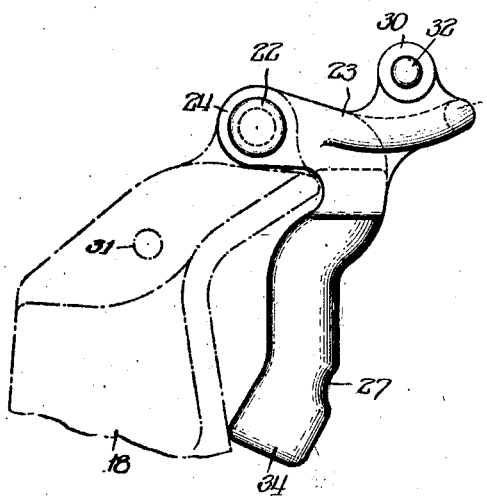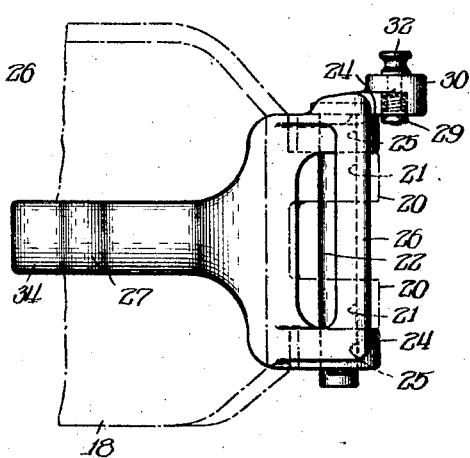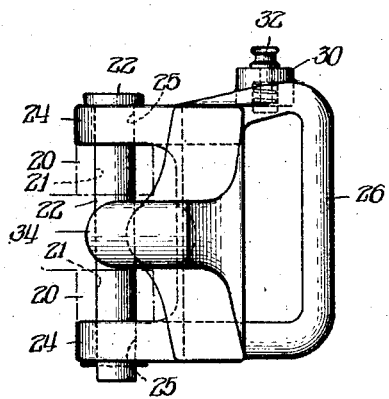

Patented Oct. 26, 1926.

1,604,356

UNITED STATES PATENT OFFICE.

EDMUND P. KINNE, OF ALLIANCE, OHIO, ASSIGNOR TO AMERICAN STEEL FOUNDRIES, OF CHICAGO, ILLINOIS, A CORPORATION OF NEW JERSEY.

TRANSITIONAL CAR COUPLING.

Application filed July 21, 1924. Serial No. 727,152.

This invention relates to transitional car couplings for use on foreign cars during the period in which couplings for such foreign cars are changed from the hook and chain coupling to the standard M. C. B. coupling.

One object of the invention is to provide a simple, durable, and efficient transitional car coupling in which the parts cooperate in a simple and efficient manner.

Another object is to provide a transitional car coupling adapted to meet the various requirements under service conditions.

These and other objects are accomplished by means of the arrangements disclosed on the accompanying sheets of drawings, in which—

Figure 1 is a fragmentary top plan view of the ends of adjacent cars, one equipped with a foreign coupling and the other with a standard M. C. B. coupling having attached thereto transitional coupling mechanism for cooperating with said foreign coupling.

Figure 2 is a fragmentary side elevation of the same, end sills being shown in section.

Figure 3 is a fragmentary top plan view somewhat similar to that shown in Figure 1, but showing two standard M. C. B. couplers coupled together, one being attached to each car, the auxiliary coupling mechanism being swung away into an inoperative position and locked.

Figure 4 is a fragmentary top plan view of a coupler provided with my auxiliary attachment shown in a position as the auxiliary coupler member is tightening the chain and being swung toward its operative position into association with the knuckle of the standard coupler.

Figure 5 is a top plan view of the coupling mechanism similar to that shown in Figure 4, but showing the auxiliary transitional coupling member in a more advanced position toward the knuckle.

Figure 6 is an enlarged top plan view of the auxiliary transitional coupling member showing its pivotal connection with the head of the coupler.

Figure 7 is a front elevation of the same auxiliary transitional coupling member.

Figure 8 is a side elevation of the same transitional coupling member.

The various novel features of my invention will be apparent from the following description and drawings, and will be particularly pointed out in the appended claims.

Referring to the figures of the drawing, it will be noted that there is disclosed the ends 10 and 11 of two adjacent cars provided with the usual buffers 12 which are used on foreign roads where hook and chain connections are used. The car 11 is provided with such a coupling connection, including a hook 13 and a chain including links 14, 15, and 16, the first of which links is pivotally secured as at 17 to a portion of the hook 13. The other car is provided with the standard M. C. B. coupler having a head 18 with a pivotally connected knuckle 19. The horn 33 of the head 18 has formed integrally therewith two outstanding and spaced ears 20 with vertically aligned openings 21 for the reception of a vertical pivot pin 22, by means of which the auxiliary transitional coupling member is pivotally attached to the coupler head.

This transitional coupling member having a general T-shape in plan view, includes a main body portion 23 having integrally formed therewith and extending laterally therefrom two ear members 24 at one end of the cross piece of the T which ear members straddle the ears 20 and have vertically aligned openings 25 also for the reception of the pivot pin 22. Extending laterally from the main body portion 23 of the auxiliary coupling member is a centrally arranged arm 34 forming the stem of the T which, when in operative position, engages the knuckle 19 at the rear thereof, whereby the arm 34 is held in a locked position. As shown in Figures 1 and 2, the middle or short link 15 of the chain is hooked over the arm 34 for completing the coupling connection between the two cars 10 and 11. It will be understood that if the two adjacent cars were equipped with the foreign type of coupling, the chain link 16 on one car would be hooked over the hook 13 on the adjacent car, but when one of the cars is equipped with a standard M. C. B. coupling, the entire length of the chain is not required. The auxiliary coupling member 23 also is provided with a relatively large vertically arranged handle 26 whereby said auxiliary coupling member may be readily moved between its operative and inoperative positions. This handle is located at a point quite remote from the pivot pin 22, whereby considerable leverage is afforded for taking the slack out of the associated coupling chain, as, for example, when the auxiliary coupling member is moved from a position shown in Figure 4 to a position shown in Figure 5, during which time the auxiliary coupling member is being swung into operative association with the knuckle of the standard M. C. B. coupler. To uncouple cars equipped with the couplers, as shown in Figures 1 and 2, it is merely necessary to permit the operation of knuckle 19 in the usual manner, whereupon as one car pulls away from the other, the auxiliary coupling member will move from the position shown in Figure 1 to a position shown in Figure 5, and then to a position shown in Figure 4, and a little further movement will cause disengagement of the link 15 from the arm 34. The auxiliary coupling arm 34 is provided with a slight curved depression 27 for engaging a corresponding curved surface 28 of the knuckle 19 whereby surface contact between the two parts in question is increased.

As shown in Figure 3, the auxiliary transitional coupling member in each case is swung to an inoperative position and locked in such position by a spring-pressed plunger 29 slidably mounted in a projection 30 also formed integrally with the main body portion of said coupling member. The plunger 29 cooperates with an opening or pocket 31 formed in the horn of the coupler. The plunger is provided with a handle portion 32 whereby it may be easily and quickly operated.

By means of this auxiliary transitional coupling member, adjacent cars, one of which has a standard M. C. B. coupling and the other a foreign coupling member, may be quickly and easily attached, and also when such cars are both equipped with standard M. C. B. couplings the transitional coupling member may be quickly swung into an inoperative position and locked there.

As shown in Figure 1, it will be noted that the right-hand buffer 12, which is connected to the car having the foreign coupling, is extended, while the left-hand buffer 12 has had its spring removed because that car is provided with a standard M. C. B. coupling. As shown in Figure 3, the springs in both the buffers 12 have been removed.

It is my intention to cover all modifications of the invention falling within the spirit and scope of the following claims.

I claim:

1. In transitional car coupling mechanism, the combination of an M. C. B. coupler having a head and a pivotally mounted knuckle, and an auxiliary T-shaped coupling member having one end of its cross piece pivotally connected to said head and having its stem attachable to the chain of the foreign coupler and held in closed position by said knuckle, said auxiliary coupling member having a handle formed at the other end of the cross piece of the T whereby said auxiliary coupling member may be operated and the slackness of said chain varied.

2. In transitional car coupling mechanism, the combination of an M. C. B. coupler having a head and a pivotally mounted knuckle, an auxiliary T-shaped coupling member having one end of its cross piece pivotally connected to said head and having its stem attachable to the chain of the foreign coupler and held in closed position by said knuckle, said auxiliary coupling member having a handle formed at the other end of the cross piece of the T whereby said auxiliary coupling member may be operated and the slackness of said chain varied, and means whereby said auxiliary coupling member may be releasably locked in inoperative position.

3. As an article of manufacture, an auxiliary T-shaped coupling member having an arm forming the stem of the T attachable to the chain of a foreign car coupler, pivotal attaching means at one end of the cross piece of the T, and a handle at the other end of the cross piece by means of which said member may be operated.

4. As an article of manufacture, an auxiliary T-shaped coupling member having an arm forming the stem of the T extending at one angle attachable to a chain of a foreign car coupler, a pivotal attaching ear at one end of the cross piece of the T extending at another angle, and an operating handle at the other end of the cross piece formed in a part extending at another angle whereby said member may be operated.

Signed at Alliance, Ohio, this 16th day of July, 1924.

EDMUND P. KINNE.